March 21, 1961    C. H. MURFIN    2,975,538
EMBLEM AND MEANS FOR MOUNTING IT

Filed April 26, 1960    2 Sheets-Sheet 1

INVENTOR.
CLIFTON H. MURFIN
BY
MAHONEY, MILLER & RAMBO, ATTY'S.
BY

March 21, 1961  C. H. MURFIN  2,975,538
EMBLEM AND MEANS FOR MOUNTING IT
Filed April 26, 1960  2 Sheets-Sheet 2

INVENTOR.
CLIFTON H. MURFIN
BY
MAHONEY, MILLER & RAMBO, ATTY'S.

United States Patent Office 2,975,538
Patented Mar. 21, 1961

2,975,538

EMBLEM AND MEANS FOR MOUNTING IT

Clifton H. Murfin, 3181 W. Broad St., Columbus, Ohio

Filed Apr. 26, 1960, Ser. No. 24,779

4 Claims. (Cl. 40—20)

My invention relates to an emblem and means for mounting it. By the term "emblem" I intend to cover nameplates, badges, medallions, insignia and other similar devices. It has to do, more particularly, with an emblem unit which consists of the emblem itself and with attaching or mounting means which is particularly useful in attaching the emblem to a curved surface. However, the attaching means will also function effectively on corrugated, honeycombed, or flat surfaces.

My invention has to do with the type of emblem commonly attached to an automobile, the emblem being an auto club emblem or other identification or insignia. It has been customary in the last few years to attach emblems of this type to cars by means of contact cement or adhesive. However, with recent design of cars, the only surfaces usually available for attachment of the emblem are curved surfaces. This is even true of bumpers on modern day cars which are curved. Therefore, recently there has been considerable difficulty encountered in attaching these emblems to cars. My invention, however, is not limited to the attachment of emblems to cars but may be used in connection with boots, with various types of equipment and vehicles, and with many other types of equipment.

It is the main object of my invention to provide an emblem unit which includes the emblem or body itself with means connected thereto for attaching the emblem body to a surface by the contact adhesive method, the entire unit being so designed and constructed that the unit can be readily mounted on curved surfaces, whether the surfaces are either concave or convex, or combinations thereof, and whether the surface is curved in one direction relative to the emblem body or in a direction at right angles to the first direction or is curved in combinations thereof. However, the unit can be mounted on various other surfaces such as corrugated, honeycombed or flat surfaces.

Another object of my invention is to provide an emblem unit of the type indicated which includes a relatively inflexible emblem body portion and a flexible attaching portion which are connected together to permit flexing of the attaching portion relative to the body portion so as to facilitate contact of the attaching portion with the surface to which it is to adhere.

Various other objects will be apparent.

In the accompanying drawings, I have illustrated the preferred embodiment of my invention and in these drawings.

Figure 1:
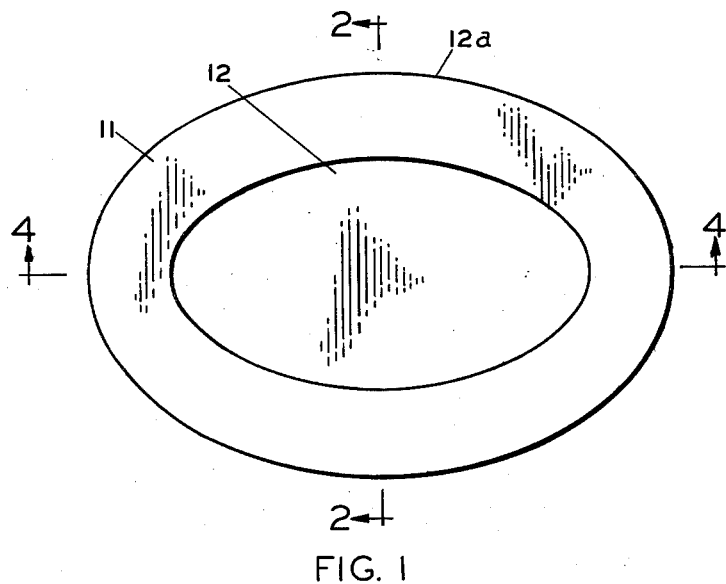
Figure 1 is a front elevational view of the emblem unit.
Figures 2, 3:
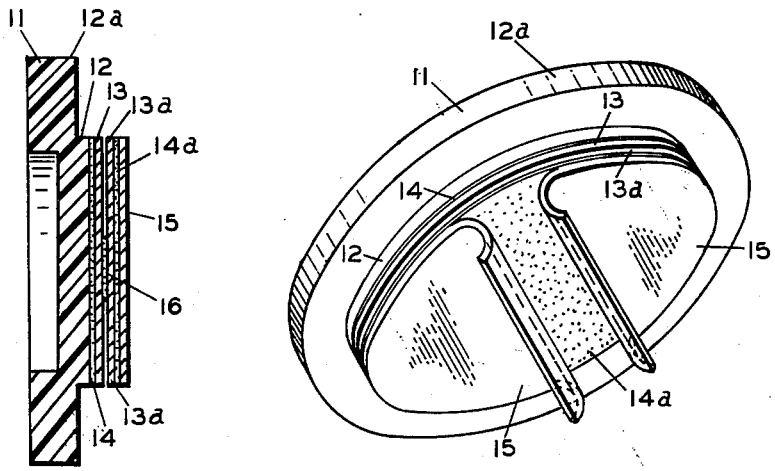
Figure 2 is a vertical sectional view taken along line 2—2 of Figure 1.
Figure 3 is a rear perspective view of the unit.
Figure 4:
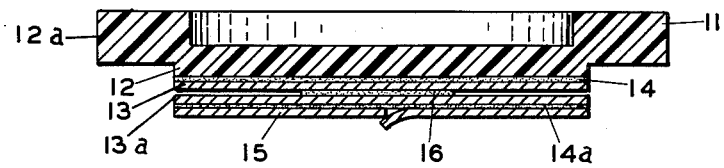
Figure 4 is a horizontal sectional view taken along line 4—4 of Figure 1.

With reference to the drawings, in Figures 1 to 4 I have illustrated an emblem unit which comprises the main body or emblem 11 of any suitable outline which is usually relatively flat or has a flat inner surface. The body 11 is usually made relatively inflexible and of plastic although it may be of any other suitable material. The body 11 ordinarily is provided with an insignia, emblem or lettering, or combination of these. The emblem body 11 comprises a central area 12 which is of suitable outline and projects from the rear surface of the body to a greater extent than the outer band area 12a. Thus, there is a central plateau or embossed area 12 on the rear surface of the emblem body 11. A layer or sheet of flexible tape material 13, such as cloth or paper, which has on its face a coating 14 of contact adhesive, is attached to the raised or plateau area 12 and is preferably of the same area. This adhesive 14 adheres to the face of the sheet 13 and also adheres to the raised back surfaces 12 of the body 11 with which it contacts, as shown best in Figures 2 and 4. Ordinarily, the rear surface of the sheet 13 is merely coated with contact adhesive and this latter coating is used for contacting a supporting surface in mounting the emblem. However, because the emblem body 11 is not flexible, this is not possible when the emblem is to be applied to a curved surface. Therefore, I provide the additional attaching means illustrated in the drawings.

This additional attaching means comprises another layer or sheet of flexible material 13a of the same area as the material 13 and similar thereto except that it has the adhesive coating 14a on its rear surface rather than on its front surface. This coating 14a is protected by strips 15 which may be peeled therefrom to expose the contact cement or adhesive 14a. Furthermore, the unit comprising the protective strips 15 and the sheet 13a with the adhesive 14a therebetween, is attached to the sheet 13 in a flexible manner so that it may be curled rearwardly therefrom completely around its edge. For this purpose, the attaching means comprises a relatively small area or pad of adhesive 16 which is positioned between the rear face of the sheet 13 and the front face of the sheet 13a. Since this pad or section of adhesive 16 is of substantially less area than the facing surfaces of the sheets 13 and 13a and is centered well within the edge of the sheet 13a, the unit formed by the adhered members 13a and 15 will have an outer edge area not connected to the sheet 13. Consequently, this outer edge area will be free and flexible and gives a butterfly wing effect around the emblem. Therefore, mounting of the emblem unit on curved surfaces is facilitated as indicated in Figures 5 to 8.

Figures 5, 6:
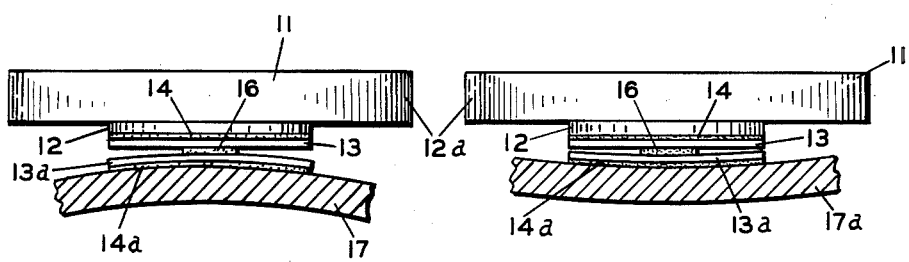
Figure 5 is a diagrammatic view showing the mounting of the emblem on a convex surface curved in one direction.
Figure 6 is a view similar to Figure 5 but showing the emblem mounted on a concave surface curved in one direction.
Figure 7:
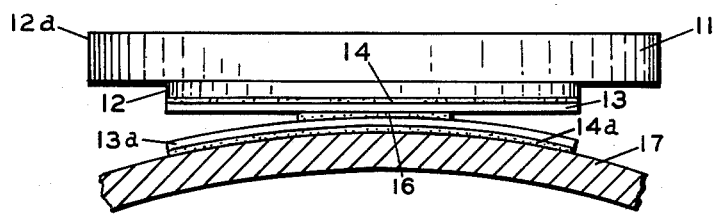
Figure 7 is a view similar to Figure 5 but showing the emblem mounted on a surface curved relative to the emblem at right angles to that shown in Figure 5.
Figure 8:
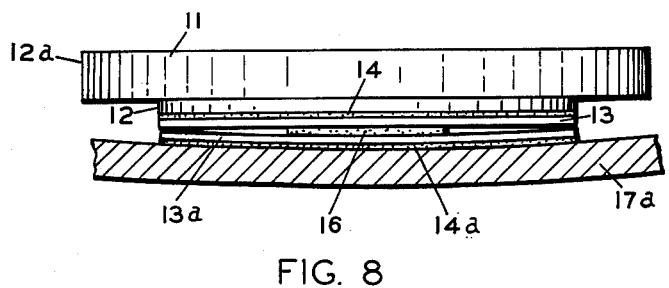
Figure 8 is a view similar to Figure 6 but showing the emblem mounted on a surface curved at right angles to that of Figure 6.

In mounting the emblem, the protective films 15 are peeled from the rear surface of the sheet 13a which is covered by the contact cement or adhesive 14a. Then it is merely necessary to contact this adhesive 14a with the curved or other surface which is to support the emblem unit. Because the outer edge area of the member 13a is flexible, it can be bent or curled into firm contact with the curved surface without any effect on the flat sheet 13 which is attached to the emblem body 11. As shown in Figures 5 and 6, the sheet or layer 13a may be curved to conform to the curvature of a convex support 17, the curvature of which is shown transversely of the emblem, while the sheet 13 will be in flat contact with the flat emblem. In Figure 6, the support 17a is shown curved concavely but still transversely relative to the emblem body 11 and it will be noted that the sheet or layer 13a will conform thereto. However, the sheet or layer 13 is still flat on the back of the flat emblem 11. Figure 7 illustrates an arrangement similar to Figure 5 but shows that the support 17 is also curved in a direction longitudinally of the flat emblem at right angles to the curvature of Figure 5. Figure 8 shows an arrangement similar to Figure 6 but the support 17a is curved longitudinally of the flat emblem and at right angles to the curvature in Figure 6. The emblem unit is equally applicable to any combination of curves because of the flexible nature of the attaching layer and the manner in which it is flexibly attached to the emblem body. Use, especially on a concave surface, is facilitated by the provision of the central raised area 12 which projects a greater distance from the rear surface of the body 11 than the band or outer area 12a.

It will be apparent from the above description that I have provided a simple and inexpensive arrangement embodied in an emblem unit for attaching it to a surface and especially a curved surface. However, the unit can also be readily attached to corrugated, honeycombed, flat or other surfaces. Although the unit is simple and inexpensive, it efficiently solves a problem which has been troublesome in the last few years in mounting emblems on supporting surfaces, especially curved surfaces, of a car or other equipment.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. A unit for attachment to a supporting surface comprising a relatively inflexible body having an exposed front surface and a rear surface, means for attaching the body to a supporting surface, said means comprising a flexible adhesive-bearing attaching layer having an exposed rear surface which carries adhesive and a front surface, and means for attaching the front surface of the layer to the rear surface of the body and including attaching means extending over said front surface of the attaching layer at an area substantially less than the area of said attaching layer and located well within the edge of the layer so that the outer margin of the layer is flexible whereby the layer can flex relative to said body to conform substantially to the contour of said supporting surface to which its rear surface is to adhere.

2. A unit for attachment to a supporting surface comprising a relatively inflexible body having an exposed front surface and a rear surface, means for attaching the body to a supporting surface, said means comprising a first attaching layer having adhesive on its front surface which is in contact with and adhered to said rear surface of the body, a second attaching flexible layer having adhesive on its rear surface for contacting with and adhering to said supporting surface, and means for attaching said front surface of the second layer to said rear surface of the first layer and comprising an adhesive area therebetween spaced from the edges of said surfaces for adhering both of said surfaces so that the outer marginal edge area of the second layer is free from the first layer and whereby the second layer can flex relative to said body to conform substantially to the contour of said supporting surface to which its rear adhesive surface is to adhere.

3. A unit according to claim 2 in which the rear surface of said body is flat and is formed on a rearwardly projecting area at the rear side of said body which is within a surrounding band area, said first layer being attached to said rear surface.

4. A unit according to claim 3 in which the first layer is of substantially the same area as said projecting area, said second layer being of substantially the same area as the first layer.

References Cited in the file of this patent

UNITED STATES PATENTS

| | | |
|---|---|---|
| 699,065 | Barth | Apr. 29, 1902 |
| 2,093,598 | Clark | Sept. 21, 1937 |
| 2,658,246 | Mahler | Nov. 10, 1953 |
| 2,699,618 | Stuppell | Jan. 18, 1955 |